United States Patent [19]
Germanow et al.

[11] Patent Number: 5,678,923
[45] Date of Patent: Oct. 21, 1997

[54] THERMOMETER CALIBRATOR

[75] Inventors: Andrew C. Germanow, Palmyra; Robert L. Marsh, Brockport, both of N.Y.

[73] Assignee: Germanow-Simon Corporation, Inc., Rochester, N.Y.

[21] Appl. No.: 501,895

[22] Filed: Jul. 13, 1995

[51] Int. Cl.⁶ .................................................. G01K 15/00
[52] U.S. Cl. ...................................... 374/1; 374/3
[58] Field of Search .................................. 374/1, 3

[56] References Cited

U.S. PATENT DOCUMENTS

| | | |
|---|---|---|
| 1,694,164 | 12/1928 | Crosthwait, Jr. . |
| 2,162,614 | 6/1939 | Fry et al. ............................ 374/1 |
| 2,758,469 | 8/1956 | Clements et al. .................... 374/1 |
| 3,122,018 | 2/1964 | Freeman et al. ..................... 374/1 |
| 3,606,792 | 9/1971 | Yoshimoto . |
| 3,623,370 | 11/1971 | Busch et al. . |
| 3,699,800 | 10/1972 | Waldron ............................. 374/1 |
| 3,857,286 | 12/1974 | Bissell et al. . |
| 4,075,882 | 2/1978 | Waldron ............................ 374/1 |
| 4,079,618 | 3/1978 | King ................................. 374/1 |
| 4,134,299 | 1/1979 | Rueger . |
| 4,369,352 | 1/1983 | Bowles .............................. 374/1 |
| 4,479,726 | 10/1984 | Townsend ........................... 374/1 |
| 4,749,281 | 6/1988 | Nunes ............................... 374/1 |
| 4,788,871 | 12/1988 | Nelson et al. .................... 374/143 |
| 4,819,249 | 4/1989 | Ekstrom et al. ...................... 374/1 |
| 4,901,257 | 2/1990 | Chang et al. ...................... 374/172 |
| 4,904,091 | 2/1990 | Ward ............................... 374/179 |
| 5,345,064 | 9/1994 | Hesse ................................ 374/1 |

*Primary Examiner*—Diego F. F. Gutierrez
*Attorney, Agent, or Firm*—Eugene Stephens & Associates

[57] ABSTRACT

A thermometer stem is inserted into a thermally controlled receptacle housed by the calibrator to bring the thermometer to a calibration temperature. A socket in the housing engages and holds the adjustment nut of the thermometer so that the casing of the thermometer can be adjusted while the thermometer remains inserted in the calibrator. A wrench can be attached to the calibrator for rotating thermometer casings, enhancing ease of use of the device. An adapter can be placed over the socket to allow use with adjusters of various sizes and shapes.

14 Claims, 3 Drawing Sheets

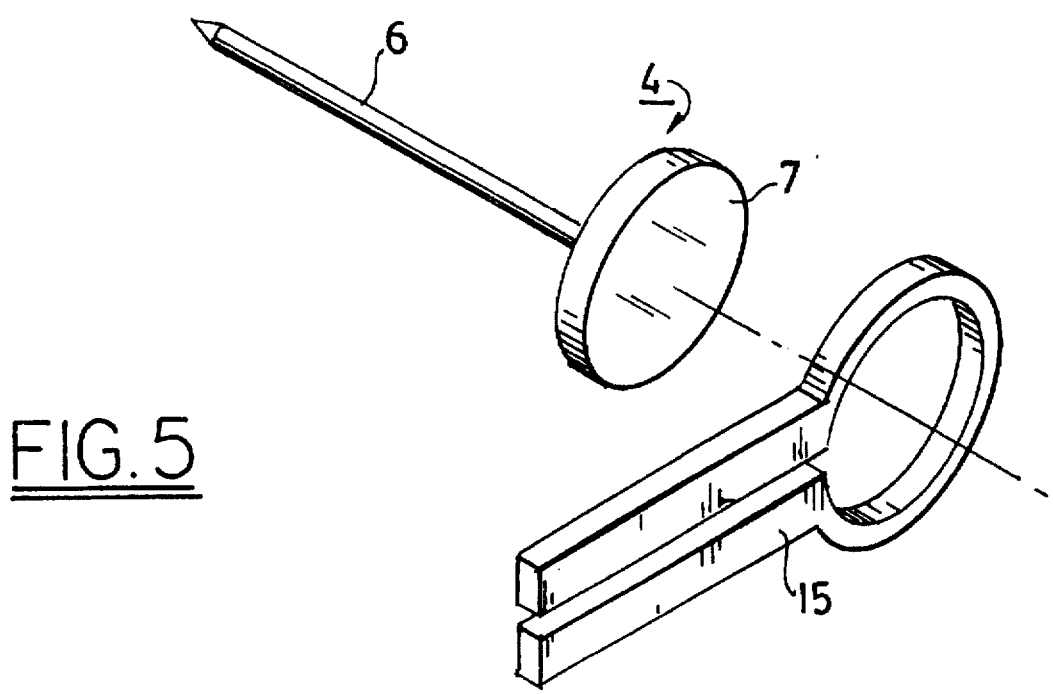

THERMOMETER CALIBRATOR

FIELD OF THE INVENTION

The invention relates to the calibration of stem thermometers. Examples of applications in which such thermometers are used are cooking, laboratory work, or testing, though the thermometers can be used to measure any suitable medium.

BACKGROUND OF THE INVENTION

Stem thermometers have a stem which can be inserted into a medium to measure its temperature. One popular use for stem thermometers is monitoring cooking food, especially meat. Throughout the specification, this use will serve as an example, even though the invention can be used to calibrate thermometers applied to many other purposes.

In cooking, a dial and a pointer of a stem thermometer indicate the temperature of the interior of the food. These thermometers need to be calibrated occasionally to ensure accurate temperature measurement and, in the case of food monitoring, optimum cooking of the food. An improperly adjusted or off-calibration thermometer can cause serious problems. In the case of meat cooking, undercooking can result in serious illness, while overcooking shrinks the meat and alters the flavor, making the meat less palatable.

Stem thermometers used in restaurants are sometimes calibrated by comparison with each other, which can lead to error if the comparison standard thermometer is off calibration. Testing laboratories calibrate thermometers with special equipment that is too expensive and cumbersome for restaurant use, though smaller and portable calibrators are available. Use of these calibrators involves holding the thermometer stem in thermal communication with a heat sink that is raised to a calibration temperature, and using a wrench to turn an adjuster on the back of the thermometer to bring the dial and pointer into calibration.

DESCRIPTION OF THE RELATED PRIOR ART

U.S. Pat. No. 4,749,281 to Nunes discloses a universal thermometer movement which can be used in a variety of thermometer housings, indicators, and scales. This device is related to thermometers of the type calibrated by the instant invention. One embodiment of the movement comprises a coil support, a casing, a bimetallic coil, an arbor, and an attachment point to which an end of the coil is attached. A socket receives the arbor, the outer end of the socket being threaded to receive washers and a nut such that the socket can be tightened into place within a central aperture. Rotation of the coil support relative to the casing calibrates the thermometer movement. However, the patent does not disclose any way to determine the amount of relative rotation to impart to the movement to achieve proper calibration.

U.S. Pat. No. 1,694,164 to Crosthwait, Jr. discloses a method and apparatus for setting or adjusting thermostats of the type used in thermostatic steam traps. The specification of Crosthwait implies that the method and apparatus are used only in the assembly and installation of the thermostat. A casing forms a steam space and is closed by a top or cap having a flange that screws into the casing. The thermostatic member is a disk that expands when heated, usually as a result of the expansion of a fluid contained within the disk. A stud extends from one surface of the disk and screws into a socket projecting from the top to hold the thermostat in place in the trap. The thermostat is adjusted by screwing the stud into or out of the socket via a nut, thereby moving the disk in relation to the top.

The method and apparatus of Crosthwait require the use of three devices and many steps to calibrate thermostats. First, the thermostat alone is measured by one device which fills the thermostat with compressed air to simulate the fluid later placed in the thermostat. Then, a second device measures the change in the thermostat size as a result of mounting it in the trap top and filling it with fluid. Finally, a third device is used to adjust the thermostat after it is in the trap top. The specification does not suggest that this adjustment could be performed at the site where the thermostat is used to calibrate the thermostat after a period of use, nor does it provide for easy, one-step calibration.

U.S. Pat. No. 4,079,618 to King discloses a dry well for a temperature calibration system of the general type contemplated for use with the invention. An electronically controlled heat sink is provided into which a thermometer or temperature probe is inserted for calibration. After selecting a test temperature, the user inserts the component to be tested into a receptacle in the calibrator to heat the component to the test temperature. However, while this device is called a "calibration system," it only allows a user to test the accuracy of a thermometer. To calibrate the thermometer, the user must insert a wrench behind the thermometer head to engage and hold the thermometer adjuster. While holding the adjuster in position, the operator must rotate the thermometer head to adjust the reading. The operation can be awkward and inconvenient.

U.S. Pat. No. 4,901,257 to Chang et al. discloses another temperature calibration system. The system includes a temperature well which holds the probe to be calibrated and is very similar to the device disclosed in U.S. Pat. No. 4,079,618 to King. The temperature of the well is controlled by an electronic control system. While the device includes components which allow it to calibrate itself, there are no provisions for the calibration of the temperature probe other than a display of the temperature of the well, which can then be compared with the temperature probe readout. Thus, as with King above, the thermometer must be calibrated with an awkward and inconvenient process of inserting a wrench behind the thermometer head and holding the adjuster in place while rotating the head until the thermometer shows no significant discrepancy in its reading.

U.S. Pat. No. 4,819,249 to Ekstrom et al. discloses a device for determining the accuracy of a thermally activated instrument, such as a thermometer or temperature probe. An enclosure holds the instrument to be tested and heats the instrument using electric current. An external electric controller controls the temperature of the enclosure. Again, this device only allows the user to test the accuracy of the instrument. Calibration must be performed in a manner similar to that used in the King and Chang et al. devices, making calibration an inconvenient and awkward process.

SUMMARY OF THE INVENTION

The invention is a thermometer calibrator that allows the user to conveniently adjust the position of a thermometer dial relative to a thermometer pointer while testing the accuracy of the thermometer. The device comprises a housing containing a thermally controlled receptacle that receives the stem of a thermometer. A calibration socket engages an adjuster on the base of the thermometer casing when a user inserts the thermometer stem into the receptacle. When the thermometer's temperature reading stabilizes, the user simply rotates the casing of the thermometer until the pointer indicates the calibration temperature. If the casing of the thermometer cannot easily be turned by hand, a wrench attached to the housing can be used. A removable sleeve placed in the receptacle keeps the interior of the receptacle clean and can be removed for easy cleaning.

An object of the invention is to eliminate the necessity for inserting a wrench behind a thermometer to calibrate it. By providing a calibrator that engages and holds the thermometer adjuster, the user can simply rotate the thermometer casing without the awkwardness of inserting a wrench behind the thermometer while holding the casing as required by prior art calibrators.

Another object of the invention is to provide a convenient, easy way to calibrate thermometers to ensure that they give accurate temperature readouts. A related object of the invention is to provide a simpler, less expensive calibrator. By making it easier and less expensive for thermometer users to calibrate their instruments, especially those who use cooking thermometers, waste of resources and danger to the consumer can both be reduced.

DESCRIPTION OF THE DRAWINGS

FIG. 5 is an isometric perspective view of a preferred wrench for adjusting a thermometer casing.

DETAILED DESCRIPTION OF THE INVENTION

Figure 1:
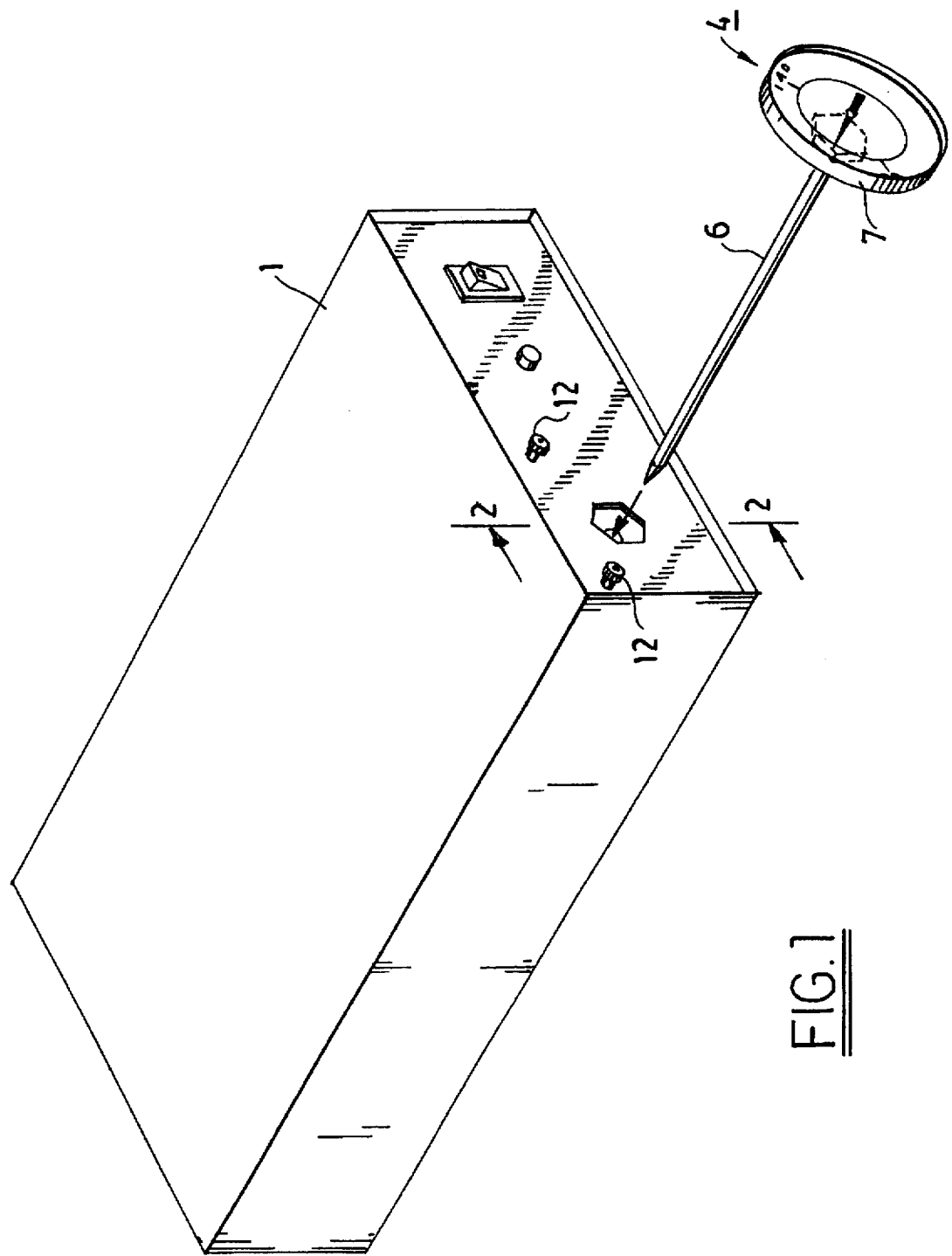
FIG. 1 is an isometric view of a thermometer calibrator of the invention positioned to receive a thermometer to be calibrated.
Figure 2:
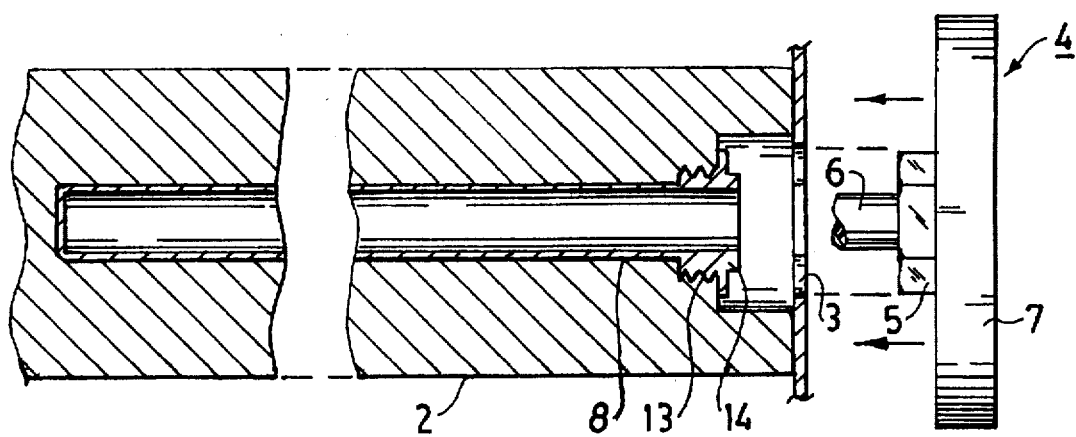
FIG. 2 is a fragmentary cross section of the calibrator of FIG. 1, taken along the line 2—2 thereof.
Figure 3:
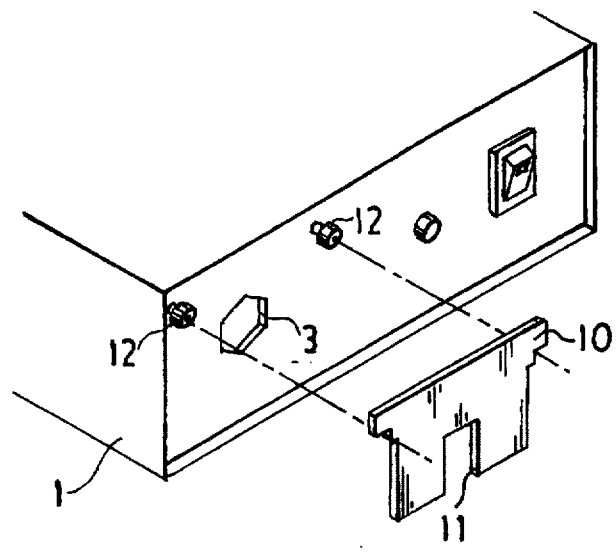
FIG. 3 is a fragmentary isometric view of a front panel of a preferred embodiment of the inventive thermometer calibrator showing an adapter usable for changing the size of a calibration socket.
Figure 4:
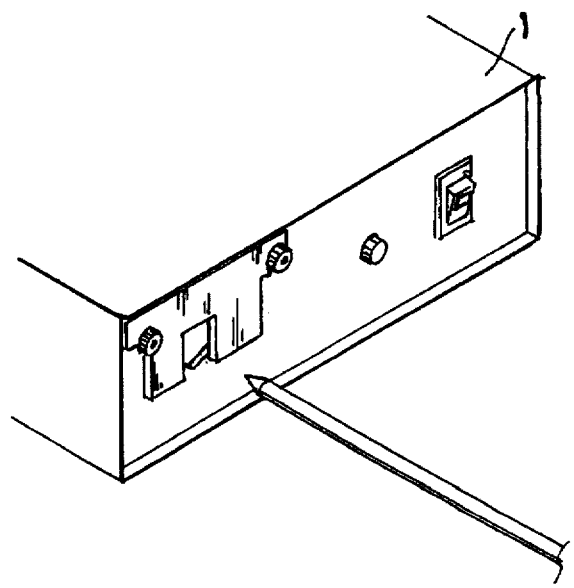
FIG. 4 is a fragmentary isometric view, similar to the view of FIG. 3, showing the calibrator socket adapter positioned on the calibrator.

With reference to FIGS. 1–5, the invention is a thermometer calibrator comprising a housing 1 and a thermally controlled receptacle 2 for a thermometer stem 6. The receptacle 2 is heated and controlled by a system of the type illustrated in, for example, the King and Chang et al. patents discussed above, though any such control unit could be used to control the receptacle 2.

The housing 1 has a calibration socket 3 which is shaped to engage an adjuster 5, in the form of an adjustment nut, on the thermometer 4. The preferred calibration socket 3 is non-circular. When the stem 6 of the thermometer 4 is inserted through calibration socket 3, the socket 3 engages the adjuster 5 on the thermometer 4. This engagement holds the adjuster 5 against rotation to facilitate adjustment of the thermometer 4 while the thermometer 4 remains inserted in the receptacle 2.

A socket adapter 10, such as a wrench plate, can be attached to the housing 1 over the socket 3 to effectively alter the socket 3 and allow thermometers with adjusters of various sizes and shapes to be calibrated. While the preferred adapter 10 is a wrench plate, bushings, inserts, or any other suitable type of adapter are within the scope of the invention. Preferably, two shoulder screws 12 hold the adapter 10 over the socket 3 such that an opening 11 in the adapter 10 engages the adjuster 5 when the thermometer stem 6 is inserted into the receptacle 2, though any suitable attachment arrangement can be used.

The receptacle 2 can accommodate a removable sleeve 8 which engages the stem 6 of the thermometer 4, protects the receptacle 2 from becoming soiled, and allows easy cleaning. In the preferred embodiment, the sleeve 8 engages as much of the stem 6 of the thermometer as possible to ensure proper heating of the stem and is held in place by threads 13. The outside end of the sleeve 8 can include a removal flange 14 or the like which, in the preferred embodiment, takes the form of a hexagonal nut integral with the sleeve 8. The operator can then remove the sleeve 8 by inserting a wrench through the calibration socket 3 to engage the removal flange.

In operation, the operator powers up the calibrator and inserts the thermometer stem 6 through the calibration socket 3 into the sleeve 8 until the calibration socket 3 or the adapter opening 11 engages the adjuster 5 of the thermometer 4. When the temperature indicated by the thermometer 4 has stabilized, the operator rotates the casing 7 of the thermometer 4 until the pointer of the thermometer 4 is pointing to the calibration temperature. If the thermometer casing 7 is difficult to turn, the operator can use a wrench 15, preferably attached to the housing 1, to rotate the head.

In the preferred embodiment of the invention, the calibration temperature is preset and cannot be changed by the operator. To this end, tamper-resistant closures, such as tamper-proof screws, hold the housing closed so that operators of the calibrator will have great difficulty opening the case. However, it is well within the scope of the invention to have an adjustable calibration temperature as well as suitable displays and controls to allow the operator to choose a calibration temperature.

The instant invention allows much more convenient and efficient calibration of thermometers. Thermometers can be calibrated while still being maintained at the calibration temperature, eliminating the awkward and inconvenient calibration process required by prior art calibrators. Further, the calibrator of the instant invention allows for the quick and easy calibration of a number of thermometers at one sitting. If the operator has a number of the same type of thermometers to calibrate one after another, the thermometer 4 can be removed and each successive thermometer inserted and calibrated.

We claim:

1. A thermometer calibrator comprising:

a housing containing a thermally controlled receptacle for a stem of a thermometer to be calibrated;

a calibration socket in the housing coaxial with the stem receptacle and shaped to receive an adjuster of a thermometer; and the calibration socket holding the adjuster such that while the thermometer stem is inserted in the receptacle, a casing of the thermometer can be rotated relative to the adjuster to calibrate the thermometer.

2. The calibrator of claim 1 further comprising a removable sleeve shaped for insertion into the stem receptacle and to receive the stem of the thermometer.

3. The calibrator of claim 2 wherein the sleeve is removed and inserted through the calibration socket.

4. The calibrator of claim 2 wherein the sleeve includes a removal flange.

5. The calibrator of claim 1 including a wrench for rotating the casing of the thermometer.

6. The calibrator of claim 1 further comprising an adapter that effectively alters the calibration socket to fit other thermometer adjusters.

7. A method of calibrating thermometers comprising the steps of:

providing a calibrator that includes a housing with a calibration socket therein and contains a thermally controlled receptacle that receives a stem of a thermometer and heats it to a calibration temperature;

maintaining the temperature of the receptacle at substantially the calibration temperature;

inserting a stem of a thermometer through the calibration socket into the receptacle, the socket engaging and holding an adjuster of the thermometer; and calibrating the thermometer while the stem remains inserted in the receptacle, wherein the step of calibrating comprises the sub-step of:

rotating a head of the thermometer while the thermometer adjuster is held by the calibration socket until a pointer of the thermometer points to the calibration temperature.

8. The method of claim 7 wherein the step of providing comprises the sub-step of:

inserting a sleeve into the receptacle before inserting the thermometer stem.

9. The method of claim 7 further comprising the step of providing a wrench and the step of rotating is performed with the wrench.

10. The method of claim 7 wherein the step of providing comprises the sub-step of:

attaching an adapter to one of the housing and the calibration socket which effectively alters the calibration socket to accommodate other thermometer adjusters.

11. A thermometer calibrator comprising:

a socket that engages and holds an adjuster of a thermometer against rotation;

a housing in which the socket is formed; and a thermally controlled receptacle inside the housing and into which the socket leads, the receptacle heating a stem of the thermometer to a predetermined calibration temperature.

12. The thermometer calibrator of claim 11 wherein the receptacle includes a removable sleeve.

13. The thermometer calibrator of claim 11 further including a wrench for rotating a housing of the thermometer.

14. The thermometer calibrator of claim 11 further including an adapter which effectively alters the socket allowing thermometers with different thermometer adjusters to be used with the calibrator.

\* \* \* \* \*